United States Patent [19]

Schroeder

[11] Patent Number: 4,566,331

[45] Date of Patent: Jan. 28, 1986

[54] ULTRASONIC DRIVER AND RECEIVER

[75] Inventor: Eugene Schroeder, Indianapolis, Ind.

[73] Assignee: Indianapolis Center for Advanced Research, Indianapolis, Ind.

[21] Appl. No.: 597,343

[22] Filed: Apr. 6, 1984

[51] Int. Cl.⁴ ............................................. G01N 29/00
[52] U.S. Cl. ........................................................ 73/632
[58] Field of Search ................. 73/632, 629, 620, 609; 367/137, 135

[56] References Cited

U.S. PATENT DOCUMENTS

| 4,114,457 | 9/1978 | Thun | 73/632 |
| 4,222,113 | 9/1980 | Hansen | 73/632 |
| 4,226,121 | 10/1980 | Knospler | 73/632 |
| 4,229,978 | 10/1980 | Sholl et al. | 73/632 |

*Primary Examiner*—Stephen A. Kreitman
*Attorney, Agent, or Firm*—Barnes & Thornburg

[57] ABSTRACT

A system for driving an ultrasonic transducer for use in ultrasound imaging of a target includes a charging voltage generator, a first impedance for coupling the charging voltage generator to a terminal of the transducer to permit the transducer to charge sufficiently slowly from the charging voltage source so that charging strain is not coupled from the transducer to the target, and a switch coupled to the transducer. Closing of the switch permits the transducer to discharge sufficiently rapidly that discharging strain is coupled from the transducer to the target. A system for processing return echoes includes a return echo-related signal processor. The return echoes impinge upon, and cause voltage signal related to the return echoes to appear across the terminals of, the transducer. The transducer is coupled to the return echo-related signal processor by a circuit including a signal splitter for dividing the return echo-related signal into two separate channels, and a signal combiner for combining the signal components from the two separate channels. The circuit including the transducer and the return echo-related signal processor has a characteristic resonant frequency. One of the two separate channels includes a delay line for delaying the signal component in the said one channel for substantially one half cycle of the characteristic resonant frequency.

15 Claims, 12 Drawing Figures

ULTRASONIC DRIVER AND RECEIVER

This invention relates to ultrasonic diagnostic apparatus for medical examinations, and more particularly to an improved ultrasonic driver and receiver for use in such diagnostic apparatus.

A valuable technique in medicine is the visualization of tissue by ultrasonic echoes returned from tissue in response to a pulse of ultrasonic energy, in much the same manner as that of a sonar system. From the returned echoes, irregularities and discontinuities in the structure of the tissue caused by, for example, cancerous cells, can be visualized.

The typical ultrasonic transducer comprises a disk of piezoelectric material, such as lead metaniobate. A typical disk is about 0.015" thick and about 0.5" to about 2" in diameter with electrodes on each of its faces. When a voltage is applied across the disk, the disk is strained. Discharging the voltage releases the strain and couples an ultrasonic pulse to a coupling medium, such as water, in contact with the transducer. The disk is also strained by a returned ultrasonic echo, and a voltage related in magnitude to the strength of the echo is generated. Due to various interactions, both internal and external, the exact response is complex and has been the subject of numerous research papers.

The transducer may be considered as a large capacitor with the distance between the plates changing by a small amount in response to a voltage or a strain. The transducer and the circuit in which it is coupled have a resonant frequency which depends in part upon the transducer's thickness and the materials form which it is formed. The decay of the transducer's response is controlled by circuit losses, with fast decay resulting from high losses through, for example, high transducer load circuit losses, and slow decay resulting from low losses through, for example, low transducer load circuit losses.

The returning echoes from the tissue stress the transducer, producing low voltages across it and its load circuit. The voltage across the load circuit is amplified to provide the displayed echo.

If the transducer is driven in a displacement mode by application of a wide pulse with a period more than the time for the reflection from the target, a reflection for each of the leading and trailing edges of the drive waveform is produced, identical except for a polarity reversal (assuming identical drive condition). As the pulse is made narrower, the two edge reponses interact. The typical systems presently used in ultrasonic diagnostic devices include pulse generators providing narrow pulses (one-half cycle of the transducer load circuit resonant frequency) to transducers which are loaded by low resistance to control electrically the damping of the resulting resonance. For a pulse width equal to one-half of the period at the resonant frequency, the superposition of the returned echoes from the leading and trailing edges of the drive pulse causes maximum interaction and a larger response for the second half cycle of the first edge response and all cycles thereafter. This produces a result indicative of a large apparent echo. Though this is a method typically used, it is clear that results using this method are incorrect. It is impossible to produce a unipolar response utilizing such a method since the interacting responses add rather than subtract.

A liquid transfer medium transforms a constant displacement waveform into a compression/rarefaction pair. The actual response from a reflecting surface in a liquid medium is a unipolar pulse as a result of stress when the driving force is a step displacement as, for example, by a piston. This pulse, when detected by a transducer, is converted into a damped oscillation power output.

SUMMARY OF THE INVENTION

According to the invention, a system for driving an ultrasonic transducer for use in ultrasound imaging of a target includes means for generating a charging voltage and a first impedance for coupling the charging voltage generator to a terminal of the transducer to permit the transducer to charge sufficiently slowly from the charging voltage source so that charging strain is not coupled from the transducer to the target. The system further includes a switch and means for coupling the switch to the transducer. Closing of the switch permits the transducer to discharge sufficiently rapidly that discharging strain is coupled from the transducer to the target.

According to illustrative embodiments, the system further includes a second impedance, and means for coupling the second impedance both in the charging circuit comprising the voltage source, the first impedance and transducer, and also in the discharging circuit comprising the transducer and switch.

Additionally according to illustrative embodiments, the second impedance has a variable impedance value, with the impedance value of the second impedance to signal at the charging and discharging levels of the transducer in response to the voltage source and switch operation being relatively lower, but the impedance of the second impedance to signal at the level generated in the transducer in response to returning echoes from the target being relatively higher.

Further according to illustrative embodiments, the system further includes mean for amplifying the signal at the level generated in the transducer in response to returning echoes from the target.

Illustratively, the switch comprises an electronic switch, such as a field effect transistor. The second impedance illustratively comprises antiparallel coupled diodes in series both with the transducer charging circuit comprising the voltage source, first impedance and transducer and also the discharging circuit comprising the transducer and switch. The amplifying means illustratively comprises an operational amplifier and the means for coupling the second impedance to the amplifying means comprises means for coupling an operational amplifier input across the antiparallel diodes.

According to illustrative embodiments, the discharge circuit including the transducer has a characteristic resonant frequency, and the amplifying means includes a amplifier output terminal. The system further comprises means for processing return echo-related signals generated by return echoes to the transducer which cause echo voltages to appear across the transducer and second impedance for amplification by the amplifying means, and means for coupling the amplifier output to the return echo-related signal processor.

Illustratively, the means for coupling the amplifier output to the return echo-related signal processor comprises a signal splitter for dividing the signal into two separate channels, and a signal combiner for combining the signal components from the two separate channels. One of the two separate channels includes a delay line for delaying the signal component in the said one channel for substantially one half cycle of the characteristic resonant frequency to reduce substantially at the output of the signal combiner the charactertistic resonant response of the circuit including the transducer and switch to the return echoes.

Additionally, according to illustrative embodiments, the circuit including the transducer has a characteristic decay time, and the means for coupling the amplifier output to the return echo-related signal processor comprises a signal splitter for dividing the signal into two separate channels, and a signal combiner for combining the signal components from the two separate channels. One of the two separate channels includes a delay line for delaying the signal component in the said one channel for substantially one half cycle of the characteristic resonant frequency. The other of the two separate channels includes an attenuator for attenuating the signal component in said other channel by an amount approximating the decay from one half cycle of the characteristic resonant frequency to the next to reduce substantially at the output of the signal combiner the characteristic resonant response of the circuit including the transducer and switch to the return echoes.

According to another aspect of the invention, a system is provided for processing return echoes produced when an ultrasonic transducer is used to generate an ultrasonic burst which travels to a target, the echoes from the target impinging upon, and causing voltage signal related to the return echoes to appear across the terminals of, a return echo transducer. The system includes a return echo-related signal processor and means for coupling the return echo-related signal processor to the return echo transducer. The circuit including the return echo transducer and the means for coupling the return echo-related signal processor to the return echo transducer has a characteristic resonant frequency. The means for coupling the return echo-related signal processor to the return echo transducer includes a signal splitter for dividing the return echo-related signal into two separate channels, and a signal combiner for combining the signal components from the two separate channels. One of the two separate channels includes a delay line for delaying the signal component in the said one channel for substantially one half cycle of the characteristic resonant frequency to reduce substantially at the output of the signal combiner the characteristic resonant response to the return echoes of the circuit including the return echo transducer and the means for coupling the return echo-related signal processor to the return echo transducer.

Illustratively, the circuit including the return echo transducer and the means for coupling the return echo-related signal processor to the return echo transducer has a characteristic decay or relaxation time, and the other of the two separate channels includes an attenuator for attenuating the signal component in the other channel. The signal component in the other channel is attenuated by an amount approximating the decay from one half cycle of the characteristic resonant frequency to the next to reduce substantially at the output of the signal combiner the characteristic resonant response to the return echoes of the circuit including the return echo transducer and the means for coupling the return echo-related signal processor to the return echo transducer.

According to another aspect of the invention, a method for driving an ultrasonic transducer for producing an ultrasound image of a target comprises the steps of generating a charging voltage, coupling the charging voltage through a first impedance to a terminal of the transducer to permit the transducer to charge sufficiently slowly from the charging voltage source so that charging strain is not coupled from the transducer to the target, and closing a switch coupled to the transducer to permit the transducer to discharge sufficiently rapidly that discharging strain is coupled from the transducer to the target.

According to yet another aspect of the invention, a method is provided for processing return echoes produced when an ultrasonic transducer is used to generate an ultrasonic burst which travels to a target, the return echoes impinging upon, and causing voltage signal related to the return echoes to appear across the terminals of, a return echo transducer. The method includes the steps of coupling a signal from the return echo transducer to a return echo-related signal processor. The circuit including the return echo transducer and the means for coupling the return echo-related signal processor to the return echo transducer has a characteristic resonant frequency. The step of coupling a signal from the return echo transducer to the return echo-related signal processor includes dividing the return echo-related signal into two separate channels, delaying the signal component in one channel for substantially one half cycle of the characteristic resonant frequency and combining the signal components from the two separate channels to reduce substantially the characteristic resonant response in the combined signal components to the return echoes of the circuit including the return echo transducer and the means for coupling the return echo-related signal processor to the return echo transducer.

BRIEF DESCRIPTION OF THE DRAWINGS

Features and advantages of the invention will become apparent to those skilled in the art upon consideration of the following detailed description of the preferred embodiment exemplifying the best mode of carrying out the invention as presently perceived. The detailed description particularly refers to the accompanying figures in which.

DETAILED DESCRIPTION

In the following description of the present invention, reference is made to the use of an ultrasonic driver/receiver in pulse echo tomography. It will be appreciated that the apparatus and method of the present invention are not limited solely to pulse echo tomography and that similar advantages to those described hereinafter will be achieved in other types of ultrasonic detection devices.

Figure 1A:
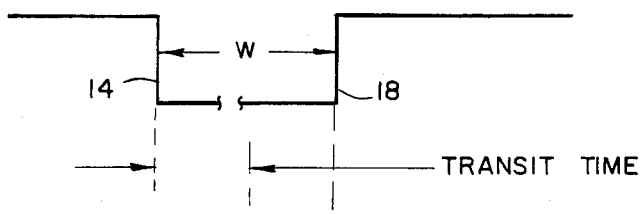
FIGS. 1a-1d illustrate various waveforms obtained from prior art systems and FIGS. 1e-1f illustrate various waveforms obtained using the apparatus and method of the present invention.
Figure 1B:
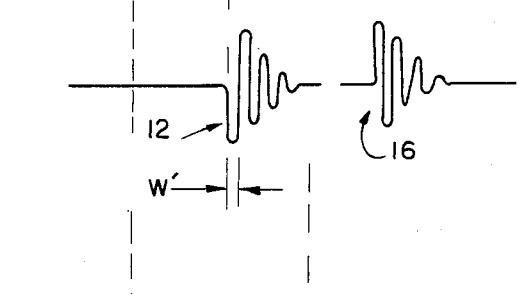
Figure 1C:
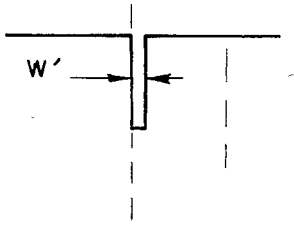
Figure 1D:
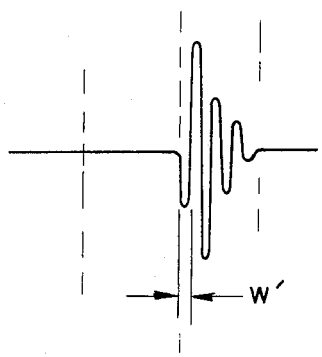

In prior art transducer systems, charge is impressed across an ultrasonic transducer very rapidly, as the transducer drive voltage waveform of FIG. 1a illustrates. This drive voltage is achieved by switching a high voltage across the charging circuit including the transducer. The result of such a rapid charging time is to couple a pulse from the transducer to the fluid coupling medium, producing a reflection 12, illustrated in FIG. 1b, for the leading (discharge) edge 14 of the waveform of FIG. 1a, but also producing a reflection 16 (FIG. 1b) for the trailing (charge) edge 18 of the drive waveform of FIG. 1a. As can be appreciated by considering waveforms 12, 16, they are essentially identical except for a polarity reversal due to the opposite sense of the leading edge 14 (negative-going) and trailing edge 18 (positive-going). As the drive signal pulse width, W, in such a prior art system is made narrower, the two edge responses begin to interact. For a pulse width W' (FIG. 1c) equal to one-half of the ringing period of the discharge circuit including the transducer, maximum interaction causes a large response for the second one-half cycle of the first edge response and all cycles thereafter (see FIG. 1d). This produces a large apparent echo. This result is incorrect, as has been previously explained.

Figure 1E:
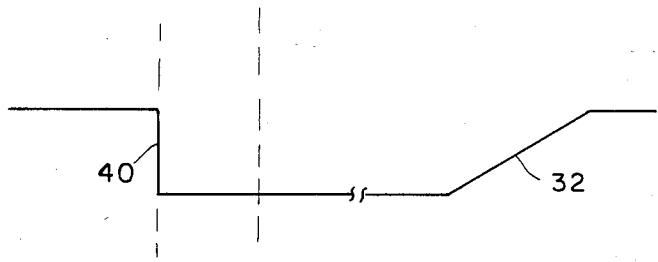
Figure 2:
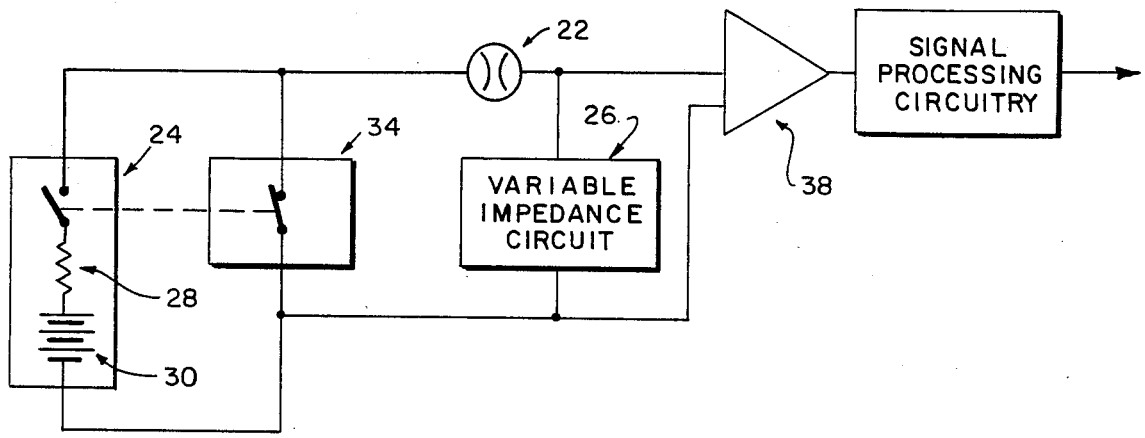
FIG. 2 illustrates a block diagram employing the present invention.

Referring to FIG. 2, a circuit according to the present invention includes an ultrasonic transducer 22 that is charged by a charging circuit 24 through a variable impedance damping circuit 26. The charging circuit 24 includes a resistor 28 in series with a charging voltage generator 30. By using such a circuit, a high voltage (e.g. 100 volts) can be impressed across the transducer 22. The impressed voltage corresponds to a stored energy of $\frac{1}{2} CV^2$ joules, where V is the impressed voltage and C is the capacitance of the transducer 22. By permitting such a charge to be stored in the transducer 22, a displacement of the transducer 22 face is caused. However, the rate of change of the displacement of the transducer 22 face is too slow, because of the charging rise time caused by the impedence of resistor 28 coupled with the capacitance C of the transducer 22 (see charging ramp 32 in FIG. 1e) to couple a pulse from the transducer 22 to a fluid coupling medium, such as water.

After the charge is stored in the transducer 22, a scan is started by closing a discharge switch in the discharge circuit 34 and holding the switch closed for the duration of the scan. The scan time is the time required for ultrasonic energy from the rapidly discharging transducer 22, the face of which is returning to its unstressed configuration, to travel to the farthest target and return (in FIG. 1a this is labelled the transit time). During the scan, it may be convenient to disconnect the charging circuit 24 from the transducer 22 as best illustrated by the broken lines between circuits 24, 34. By rapidly discharging the transducer 22, rapid return of the transducer 22 to the relaxed state is achieved. The result of this rapid discharge is that an acoustical step function drive (see discharge step 40 in FIG. 1e) is coupled to the coupling medium (not shown) by which the transducer 22 is coupled to the target. High amplitude ringing of the transducer 22, which otherwise would be coupled to the medium in the same manner as the high amplitude step function drive at discharge switch 24 closing, is avoided by the variable damping circuit 26. By utilizing the circuit of FIG. 2, a fall time of 5 nanoseconds has been achieved for a step of 100 volts with a ringing voltage of 2 volts.

Figure 1F:

The low amplitude echo voltages are not affected by the variable damping circuit 26, since typically the echoes cause voltages of less than two volts to appear across the variable damping circuit 26. Thus, the variable damping circuit 26 remains a high impedance for the returning echoes. The discharge circuit 34 remains effectively a closed switch during the echo return interval. Therefore, during the return echo interval, the echo voltage 42 in FIG. 1f developed across the transducer 22 is available to the amplifier 38.

A damped sine wave (42 in FIG. 1f) at the resonant frequency of the discharge circuit including the transducer 22 is generated in response to an echo from a reflecting surface, with only the first half cycle of the damped sine wave truly representing the returned echo from the target.

Figure 3:
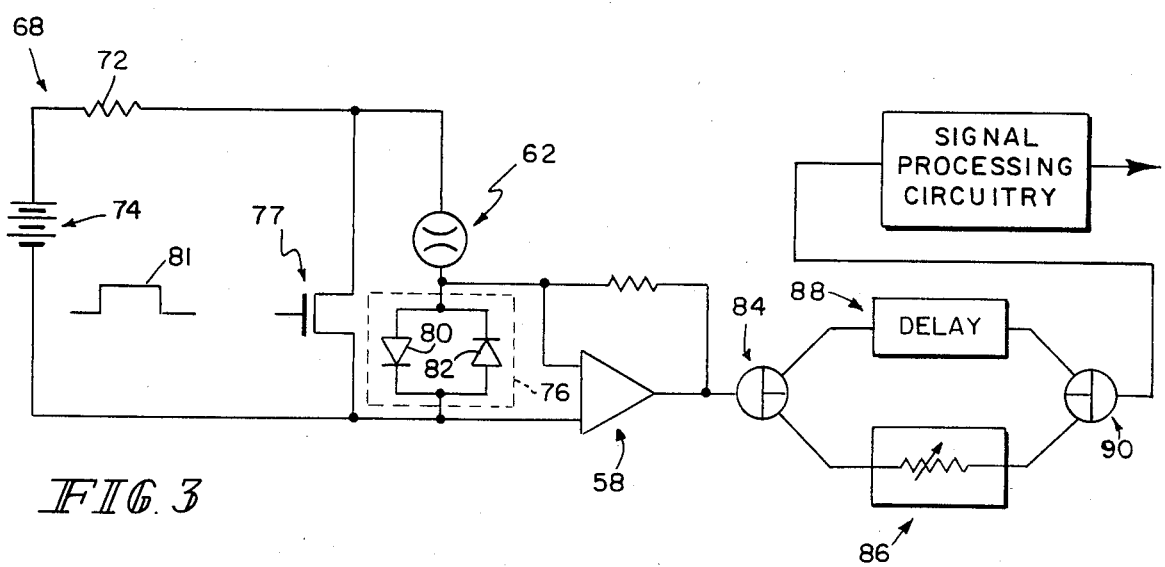
FIG. 3 illustrates a partly block and partly schematic circuit employing the present invention.
Figure 4A:
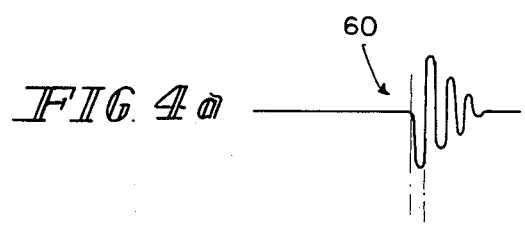
FIGS. 4a-c illustrate waveforms obtained using the apparatus and method of the present invention.
Figure 4B:
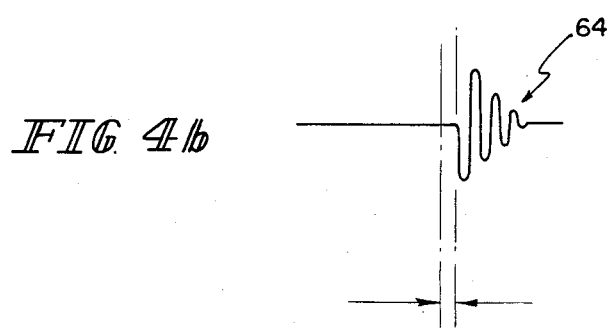

In the system illustrated in FIG. 3, the returning echo signal output of the amplifier 58 (see waveform 60 in FIG. 4a) is split into first and second signal portions. The second signal portion is delayed in time by one-half cycle of the transducer 62 characteristic resonant frequency (see waveform 64 in FIG. 4b), while the first signal portion (see waveform 60 in FIG. 4a) is linearly attenuated slightly less than the loss of amplitude in the second signal portion in the delayed path. If these two signals are then added, substantial cancellation of all portions of the amplified return echo signal after the first half cycle is achieved. Waveform 66 of FIG. 4c, which is more representative of the true echo, results. The reason the attenuation is not chosen to match exactly the attenuation of the delay line is that the second half cycle of the undelayed return echo will be of lower absolute magnitude than the delayed first half cycle by the decay between the first and second half cycles. Although the proposed attenuation is linear and not exponential, a good compromise, effecting substantial cancellation, can be achieved. As long as the system is linear and causal, superposition will apply. That is, each returned echo can effectively be treated independently and without interaction among return echoes.

Figure 4C:
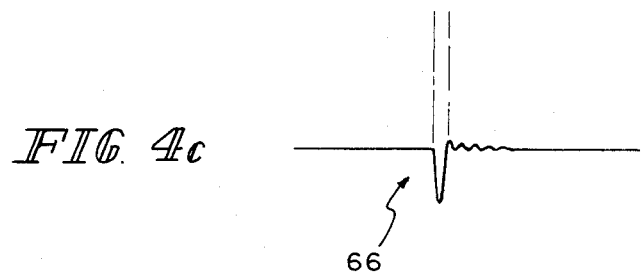

By this method, the nearly unipolar response 66 of FIG. 4c is produced by a perfect reflector, and longitudinal resolution is greatly improved over any of the techniques practiced in the prior art.

Referring to FIG. 3, a simple circuit embodying this aspect of the invention is illustrated. The charging circuit 68 comprises a resistor 72 coupled in series between a voltage source 74 and the transducer 62. A switch 77 in the discharge circuit of transducer 62 is switched by a drive waveform 81. Switch 77 opens and closes in response to its drive waveform 81. The variable impedance circuit 76 comprises two diodes 80, 82 coupled in antiparallel relation. Circuit 76 operates as a non-linear impedance variable damping network offering high impedance for the low amplitude return echo signals induced across the transducer 62. The amplifier 58 can be a transimpedance amplifier with a virtual short circuit input for signals of interest, as well as a voltage amplifier or a charge amplifier. The return signal splitter 84 can be any of a number of known types of power splitters. The attenuator 86 for the first signal portion and the delay line 88 for the second signal portion can be of any suitable types. The signals from the two channels are recombined by combiner or summing circuit 90 of known type for supply to further signal processing circuitry.

Figure 5:
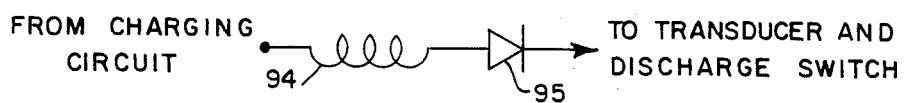
FIG. 5 illustrates a portion of an alternative circuit according to the present invention.

More complex circuitry than that illustrated could be utilized. For example, resistor 28 of FIG. 2 in the charging circuit for the transducer 22 could be replaced with a series inductor 94 and diode 96 (see FIG. 5) for a low-loss, low-voltage system. Additionally, the diodes 80, 82 of FIG. 3 could be replaced by an electronic switch which would be closed during the transmission of the ultrasound burst and open at all other times during which return echoes are expected. As discussed, the amplifier could be a charge amplifier or voltage amplifier. Most medical technologists trained in the use of ultrasonic devices prefer displays produced by straight real-time amplification. In any echo signal amplifier circuit, the amplifier input should appear as a low impedance to help minimize the ringing of returned echo signals impressed across the transducer.

What is claimed is:

1. A system for driving an ultrasonic transducer for use in ultrasound imaging of a target, the system comprising means for generating a charging voltage, a first impedance for coupling the charging voltage generator to a terminal of the transducer to permit the transducer to charge sufficiently slowly from the charging voltage source so that charging strain is not coupled from the transducer to the target, a switch, and means for coupling the switch to the transducer, closing of the switch permitting the transducer to discharge sufficiently rapidly that discharging strain is coupled from the transducer to the target.

2. The system of claim 1 and further comprising a second impedance, and means for coupling the second impedance both in the charging circuit comprising the voltage source, the first impedance and transducer, and also in the discharging circuit comprising the transducer and switch.

3. The system of claim 2 wherein the second impedance has a variable impedance value, the impedance of the second impedance to signal at the charging and discharging levels of the transducer in response to the voltage source and switch operation being relatively lower, but the impedance of the second impedance to signal at the level generated in the transducer in response to returning echoes from the target being relatively higher.

4. The system of claim 3 and further comprising means for amplifying the signal at the level generated in the transducer in response to returning echoes from the target, and means for coupling the second impedance to the amplifying means at least during the intervals when echoes are returning from the target.

5. The system of claim 4 wherein the switch comprises an electronic switch.

6. The system of claim 5 wherein the electronic switch comprises a field effect transistor.

7. The system of claim 4 wherein the second impedance comprises a bidirectional diode coupled in series with the transducer charging circuit comprising the voltage source, first impedance and transducer and the discharging circuit comprising the transducer and switch.

8. The system of claim 7 wherein the amplifying means comprises an operational amplifier and the means for coupling the second impedance to the amplifying means comprises means for coupling operational amplifier input terminals across the bidirectional diode.

9. The system of claim 4 wherein the discharge circuit including the transducer has a characteristic resonant frequency, the amplifying means includes an amplifier output terminal, and further comprising means for processing return echo-related signals generated by return echoes to the transducer which cause echo voltages to appear across the transducer and second impedance for amplification by the amplifying means, and means for coupling the amplifier output to the return echo-related signal processor.

10. The system of claim 9 wherein the means for coupling the amplifier output to the return echo-related signal processor comprises a signal splitter for dividing the signal into two separate channels, a signal combiner for combining the signal components from the two separate channels, and one of the two separate channels including means for delaying the signal component in the said one channel for substantially one half cycle of the characteristic resonant frequency.

11. The system of claim 9 wherein the circuit including the transducer has a characteristic decay.

12. The system of claim 11 wherein the means for coupling the amplifier output to the return echo-related signal processor comprises a signal splitter for dividing the signal into two separate channels, a signal combiner for combining the signal components from the two separate channels, one of the two separate channels including means for delaying the signal component in the said one channel for substantially one half cycle of the characteristic resonant frequency, and the other of the two separate channels including an attenuator for attenuating the signal component in said other channel by an amount approximating the decay from one half cycle of the characteristic resonant frequency to the next.

13. A system for processing return echoes produced when an ultrasonic transducer is used to generate an ultrasonic burst which travels to a target, the return echoes impinging upon, and causing voltage signal related to the return echoes to appear across the terminals of, a return echo transducer, the system including a return echo-related signal processor and means for coupling the return echo-related signal processor to the return echo transducer, the return echo transducer and the means for coupling the return echo-related signal processor to the return echo transducer having a characteristic resonant frequency, the means for coupling the return echo-related signal processor to the return echo transducer including a signal splitter for dividing the return echo-related signal into two separate channels, and a signal combiner for combining the signal components from the two separate channels, one of the two separate channels including means for delaying the signal component in the said one channel for substantially one half cycle of the characteristic resonant frequency.

14. The system of claim 13 wherein the circuit including the return echo transducer and the means for coupling the return echo-related signal processor to the return echo transducer has a characteristic decay.

15. The system of claim 14 wherein the other of the two separate channels includes an attenuator for attenuating the signal component in said other channel by an amount approximating the decay from one half cycle of the characteristic resonant frequency to the next.

* * * * *